H. M. HOBART.
ELECTRICAL APPARATUS.
APPLICATION FILED JAN. 23, 1914.

1,121,014.

Patented Dec. 15, 1914.
3 SHEETS—SHEET 1.

Witnesses:
Chas. B. Stokes
J. Ellis Glen

Inventor:
Henry M. Hobart.
by Albert G. Davis
His Attorney.

H. M. HOBART.
ELECTRICAL APPARATUS.
APPLICATION FILED JAN. 23, 1914.

1,121,014.

Patented Dec. 15, 1914.
3 SHEETS—SHEET 3.

Witnesses
Chas B Stokes
J. Ellis Glen.

Inventor
Henry M. Hobart
by Albert G. Davis
His Attorney

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRICAL APPARATUS.

1,121,014.     Specification of Letters Patent.     Patented Dec. 15, 1914.

Application filed January 23, 1914. Serial No. 813,899.

*To all whom it may concern:*

Be it known that I, HENRY M. HOBART, a citizen of the United States, residing at Schenectady, in the county of Schenectady, State of New York, have invented certain new and useful Improvements in Electrical Apparatus, of which the following is a specification.

My invention relates to electrical apparatus and particularly to the cooling of such apparatus and has for its object improved means whereby the heat generated during the operation of such apparatus may be quickly and effectually dissipated.

In accordance with my invention the latent heat of vaporization of a fluid, such as water, is utilized for cooling electrical apparatus by wetting the surfaces which become heated and stimulating evaporation of the moisture by directing a current of air upon the wetted surfaces. The advantage of cooling electrical apparatus in this way is that the evaporation takes place directly from the heated surface and the time rate of heat transfer is thus greatly increased. I preferably increase the moisture carrying capacity of the air, as by heating or drying it, or by both drying and heating it, before it is directed against the wetted surfaces. By heating or drying the air before it passes over the wetted surfaces, the amount of moisture that it will evaporate and carry away is greatly increased. If the air is heated by passing it through or over hot parts of the electrical apparatus, these parts are also cooled.

My invention further consists in certain other novel features of construction which will be hereinafter pointed out in the claims annexed to and forming a part of this specification.

For a better understanding of my invention, reference may be had to the following description taken in connection with the accompanying drawings, in which—

Figure 1:
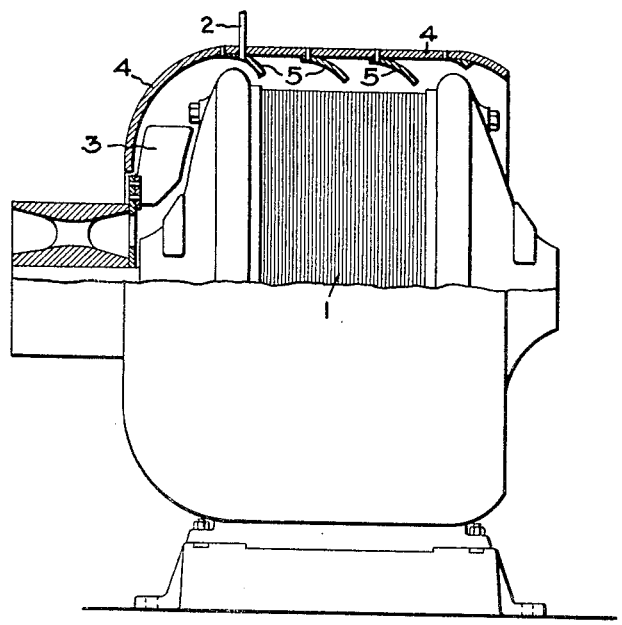
Figure 2:
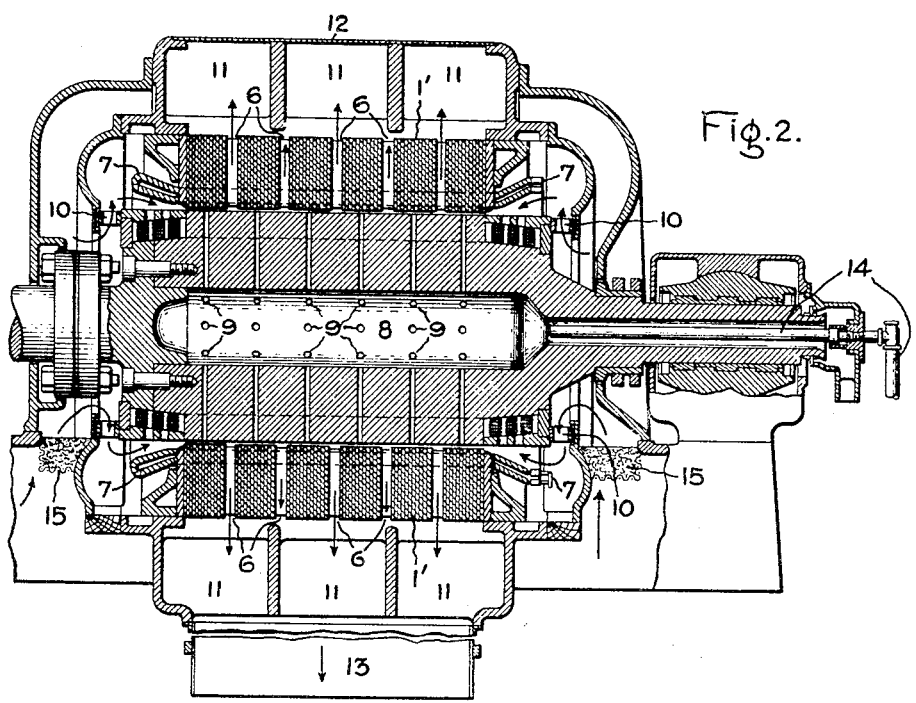
Figure 3:
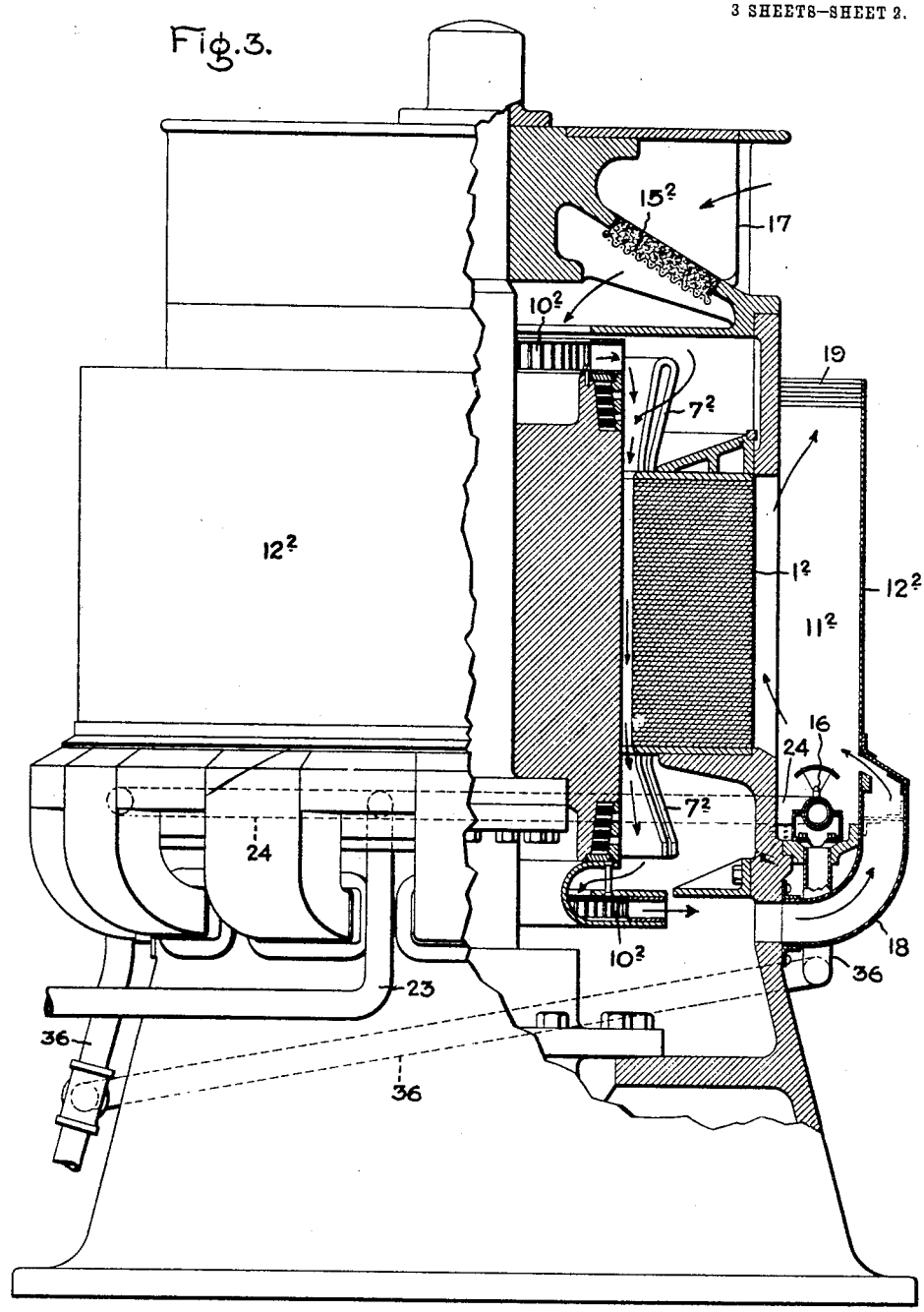
Figure 4:
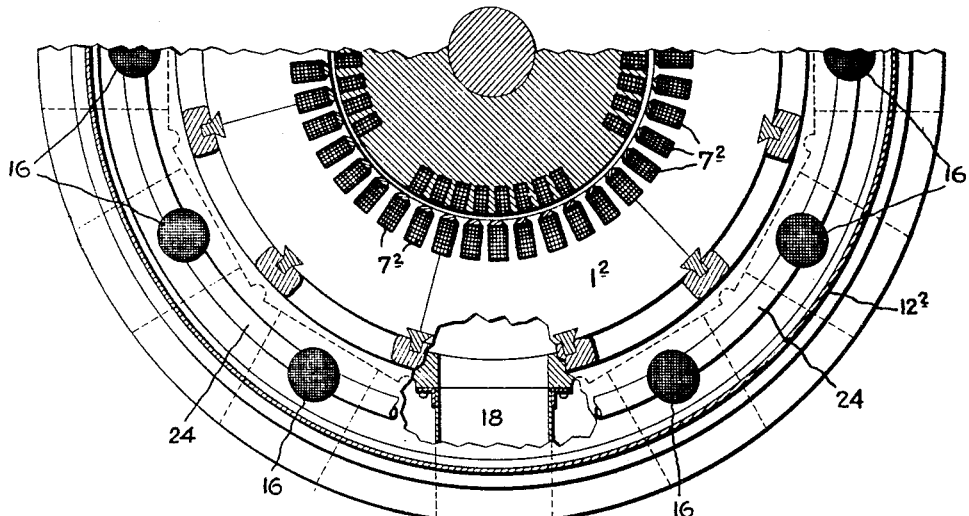
Figures 5, 6:
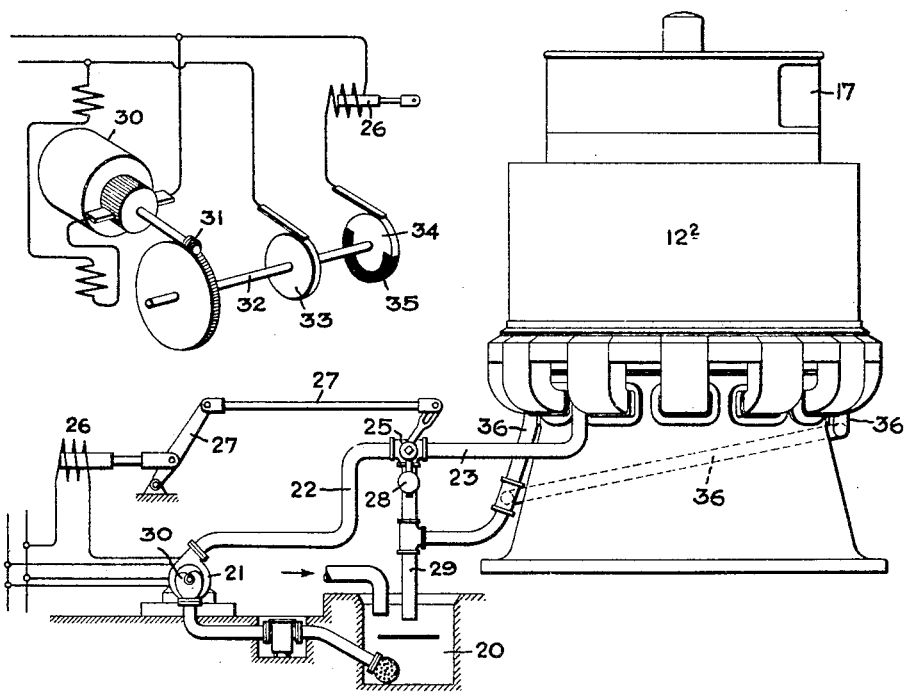

Figure 1 shows a piece of electrical apparatus embodying my invention; Figs. 2 and 3 are sectional views of dynamo electric machines embodying modifications of my invention; Fig. 4 is a sectional view of the machine of Fig. 3; Fig. 5 is an elevation of the machine of Fig. 3, and Fig. 6 shows the electrical connections of a detail.

Referring to Fig. 1 of the drawing, the electrical apparatus shown therein to which my invention is applied is an ordinary dynamo electric machine comprising stationary and rotatable members. The stationary member has a core 1 in which windings are embedded on the inner periphery thereof. The surface of the core 1 is wetted by suitable means as by a source of water or other fluid supply connected to a pipe 8. In order to stimulate the evaporation of this moisture and thereby cool the machine, I cause a current of air to be directed against the wetted surface. This may be accomplished by means of a fan 3 mounted on the rotatable member of the machine. The fan forces air into a chamber formed between a casing 4 and the core 1, and the air may be directed directly against the core by means of the baffles 5. The core 1 of the totally inclosed dynamo electric machine shown in this figure is made solid, so that water may not enter the interior of the machine.

In the dynamo electric machine shown in Fig. 2 the stationary member comprises a core 1' provided with ducts 6 and windings 7 on the inner periphery thereof. The rotatable member is cored out to form a chamber 8, this chamber being connected with the periphery of the rotatable member by means of radial holes 9. At the ends of the rotatable member are mounted fans 10 which suck air into the machine as shown by the arrows, force it over the periphery of the rotatable member, and over the windings 7 and the inner periphery of the core 1' of the stationary member, then through the ducts 6 into a chamber 11 formed between a casing 12 and the outer periphery of the core 1', from whence it escapes through the duct 13. A pipe 14 is connected to a source of water or other fluid supply and conducts the fluid to the chamber 8 from which it is sprayed upon the inner periphery of the core 1' by the holes 9. Instead of wetting the inner surface of the core 1' in this way, any other arrangement may be used whereby this surface of the core 1' or the surface of the rotor may be wetted. The passage of the air over the inner periphery of the core, as explained above, evaporates this moisture and thereby cools the core. In this arrangement, the evaporation takes place about the windings of the machine, where the greatest amount of heat is generated. By passing the air over the end windings of both stationary and rotatable members, the temperature of the air is increased before it comes in contact with the wetted surface of the core and consequently its moisture carrying capacity is increased. In order to still further increase its moisture carrying capacity and consequently its power to cool the core, it may be subjected to any well-known drying process before it enters the machine. For this purpose, I have shown in this figure chambers or screens 15 containing a desiccating agent, such as calcium chlorid or phosphorus pentoxid, mounted in the air inlets, so that the incoming air is subjected to a preliminary drying process. The preliminary drying may also be by refrigeration.

In the dynamo electric machine shown in Figs. 3 to 5 the stationary member has a solid core $1^2$ provided with windings $7^2$. The rotatable member is shown as provided with a fan $10^2$ at each end thereof. These fans suck air through the interior of the machine and force it out of the machine against the surface of the core $1^2$ and into a chamber $11^2$ formed between the casing $12^2$ and the exterior surface of the core $1^2$. The surface of the core $1^2$ is wetted or sprayed with a fluid, such as water, by the nozzles 16, which are preferably located in the chamber $11^2$. In order that the water may be completely evaporated from the surface of the core, a device is employed for intermittently turning the water on and off, so that the surface will be intermittently wetted.

As shown in these figures of the drawing, air is sucked into the machine through an opening 17, which may be provided with a screen $15^2$ containing a desiccating agent, for subjecting the incoming air to a preliminary drying process. The air then passes through the upper fan $10^2$, over the windings $7^2$, through the air gap between the rotatable and stationary members, through the lower fan $10^2$, then through the passages 18 into the chamber $11^2$ where it is directed against the wetted surfaces of the core $1^2$, and evaporates the moisture, thereby cooling the core. By passing the air over the heated parts of the machine, these parts of the machine are cooled but the temperature of the air is raised. This raising of the temperature of the air, together with its preliminary drying, increases its moisture carrying capacity, and consequently its power to cool the core. The air escapes from the chamber $11^2$ at the top thereof, where it passes through baffles 19, which catch some of the moisture taken up by the air. Water is supplied from a suitable source of supply to a tank 20 from which it is pumped by means of a pump 21 through the pipes 22 and 23 to a header 24 from which it is delivered to the nozzles 16. In order to supply the water intermittently to the pipe 23 and the header 24, a three way valve 25, operated by a solenoid 26 may be employed. When the solenoid 26 is supplied with current, it moves the link mechanism 27, and thus turns the valve. When the solenoid 26 is deënergized, the weight 28 returns the valve to the position shown in the drawing. With the three way valve in one position the pump supplies water to the pipes 23, but when it is in the other position, the pipe 23 is closed and the pump is connected to a waste pipe 29, which returns the water pumped to the tank 20. The solenoid may be energized and deënergized by an arrangement similar to that shown in Fig. 6, in which the motor 30, which may be the pump motor, drives a worm 31 which in turn drives a shaft 32 carrying two contact wheels 33 and 34, the wheel 34 having an insulated portion 35. When the shaft is in the position shown in this figure, the solenoid 26 is energized, but when the shaft has turned so that the brush engaging wheel 34 comes in contact with the insulation 35 the circuit through the solenoid is broken and the solenoid is deënergized. The length of time that the solenoid is energized and deënergized may be varied, by varying the peripheral length of the insulation 35. If the motor 30 is a motor used only to drive the shaft 32, the length of time that the solenoid is energized or deënergized may be varied by varying the motor speed in any well known manner. In order to drain the chamber $11^2$ of any excess water, drain pipes 36 are provided, which are shown as connected to the waste pipe 29.

It is necessary in the arrangements described above, that the air blown against the surfaces shall not evaporate the water before it has wetted them. The opening and closing of the air supply may be operated in a similar way as explained above in connection with the intermittent water supply. I desire it to be understood that my invention is not limited to the particular electrical apparatus or arrangements shown and described, and I aim in the appended claims to cover the application of my invention to any electrical apparatus and to cover all modifications of my invention which do not depart from the spirit and scope thereof.

What I claim as new and desire to secure by Letters Patent of the United States, is:—

1. In combination, electric apparatus having a core and windings thereon, means for wetting the surface of said core, and separate means for directing a current of air upon said wetted surface.

2. In combination, electric apparatus having a core and windings thereon, means for wetting the surface of said core, separate means for directing a current of air upon said wetted surface, and means for increasing the moisture carrying capacity of the air directed upon said wetted surface.

3. In combination, electric apparatus having a core and windings thereon, means for wetting the surface of said core, separate means for directing a current of air upon said wetted surface, and means for heating the air directed upon said wetted surface to increase the moisture carrying capacity thereof.

4. In combination, electrical apparatus having a core and windings thereon, means for intermittently wetting the surface of said core, and separate means for directing a current of air upon said wetted surface.

5. In combination, electrical apparatus having a core and windings thereon, means for intermittently wetting the surface of said core, separate means for directing a current of air upon said wetted surface, and means for increasing the moisture carrying capacity of the air directed upon said wetted surface.

6. In combination, electrical apparatus having a core and windings thereon, means for intermittently wetting the surface of said core, separate means for directing a current of air upon said wetted surface, and means for heating the air directed upon said wetted surface to increase the moisture carrying capacity thereof.

7. In combination, a dynamo electric machine having stationary and rotatable members, said stationary member comprising a core and windings thereon, means for wetting the surface of said core, and a fan member mounted on said rotatable member for directing a current of air upon said wetted surface.

8. In combination, a dynamo electric machine having stationary and rotatable members, said stationary member comprising a core and windings thereon, means for wetting the surface of said core, a fan member mounted on said rotatable member for directing a current of air upon said wetted surface, and means for increasing the moisture carrying capacity of the air directed upon said wetted surface.

9. In combination, a dynamo electric machine having stationary and rotatable members, said stationary member comprising a core and windings thereon, means for wetting the surface of said core, a fan member mounted on said rotatable member for directing a current of air upon said wetted surface, and means for heating the air directed upon said wetted surface to increase the moisture carrying capacity thereof.

10. In combination, a dynamo electric machine having stationary and rotatable members, said stationary member comprising a core and windings thereon, means for intermittently wetting the surface of said core, and a fan member mounted on said rotatable member for directing a current of air upon said wetted surface.

11. In combination, a dynamo electric machine having stationary and rotatable members, said stationary member comprising a core and windings thereon, means for intermittently wetting the surface of said core, a fan member mounted on said rotatable member for directing a current of air upon said wetted surface, and means for increasing the moisture carrying capacity of the air directed upon said wetted surface.

12. In combination, a dynamo electric machine having stationary and rotatable members, said stationary member comprising a core and windings thereon, means for intermittently wetting the surface of said core, a fan member mounted on said rotatable member for directing a current of air upon said wetted surface, and means for heating the air directed upon said wetted surface to increase the moisture carrying capacity thereof.

13. In combination, a dynamo electric machine comprising stationary and rotatable members, said stationary member having a core and windings thereon, means forming a chamber about the stationary member, said chamber being connected to the interior of the machine, means mounted in said chamber for wetting the surface of said core, and separate means for causing a current of air to flow through said machine and upon the wetted surface of said core.

14. In combination, a dynamo electric machine comprising stationary and rotatable members, said stationary member having a core and windings thereon, means forming a chamber about the stationary member, said chamber being connected to the interior of the machine, means mounted in said chamber for intermittently wetting the surface of said core, and separate means for causing a current of air to flow through said machine and upon the wetted surface of said core.

15. In combination, a dynamo electric machine comprising stationary and rotatable members, said stationary member having a core and windings thereon, means forming a chamber about the stationary member, said chamber being connected to the interior of the machine, means mounted in said chamber for wetting the surface of said core, and a fan member mounted on said rotatable member for causing a current of air to flow through said machine and upon the wetted surface of said core.

16. In combination, a dynamo electric machine comprising stationary and rotatable members, said stationary member having a core and windings thereon, means forming a chamber about the stationary member, said chamber being connected to the interior of the machine, means mounted in said chamber for intermittently wetting the surface of said core, and a fan member mounted on said rotatable member for causing a current of air to flow through said machine and upon the wetted surface of said core.

17. In combination, electric apparatus having a core and windings thereon, means for wetting the surface of said core, separate means for directing a current of air upon said wetted surface, and means for drying and means for heating the air directed upon said wetted surface to increase the moisture carrying capacity thereof.

18. In combination, electrical apparatus having a core and windings thereon, means for intermittently wetting the surface of said core, separate means for directing a current of air upon said wetted surface, and means for drying and means for heating the air directed upon said wetted surface to increase the moisture carrying capacity thereof.

19. In combination, a dynamo electric machine having stationary and rotatable members, said stationary member comprising a core and windings thereon, means for wetting the surface of said core, a fan member mounted on said rotatable member for directing a current of air upon said wetted surface, and means for drying and means for heating the air directed upon said wetted surface to increase the moisture carrying capacity thereof.

20. In combination, a dynamo electric machine having stationary and rotatable members, said stationary member comprising a core and windings thereon, means for intermittently wetting the surface of said core, a fan member mounted on said rotatable member for directing a current of air upon said wetted surface, and means for drying and means for heating the air directed upon said wetted surface to increase the moisture carrying capacity thereof.

21. In combination, a dynamo electric machine comprising stationary and rotatable members, said stationary member having a core and windings thereon, means forming a chamber about the stationary member, said chamber being connected to the interior of the machine, means mounted in said chamber for wetting the surface of said core, separate means for causing a current of air to flow through said machine and upon the wetted surface of said core, and means for drying the air flowing through said machine and upon the wetted surface of the core.

22. In combination, a dynamo electric machine comprising stationary and rotatable members, said stationary member having a core and windings thereon, means forming a chamber about the stationary member, said chamber being connected to the interior of the machine, means mounted in said chamber for intermittently wetting the surface of said core, separate means for causing a current of air to flow through said machine and upon the wetted surface of said core, and means for drying the air flowing through said machine and upon the wetted surface of the core.

23. In combination, a dynamo electric machine comprising stationary and rotatable members, said stationary member having a core and windings thereon, means forming a chamber about the stationary member, said chamber being connected to the interior of the machine, means mounted in said chamber for wetting the surface of said core, a fan member mounted on said rotatable member for causing a current of air to flow through said machine and upon the wetted surface of said core, and means for drying the air flowing through said machine and upon the wetted surface of the core.

24. In combination, a dynamo electric machine comprising stationary and rotatable members, said stationary member having a core and windings thereon, means forming a chamber about the stationary member, said chamber being connected to the interior of the machine, means mounted in said chamber for intermittently wetting the surface of said core, a fan member mounted on said rotatable member for causing a current of air to flow through said machine and upon the wetted surface of said core, and means for drying the air flowing through said machine and upon the wetted surface of the core.

In witness whereof, I have hereunto set my hand this 22nd day of January, 1914.

HENRY M. HOBART.

Witnesses:
  K. A. CHAPEL,
  HELEN ORFORD.